(12) United States Patent
Hawthorn

(10) Patent No.: US 7,713,154 B2
(45) Date of Patent: May 11, 2010

(54) FIXED PITCH CONTINUOUSLY VARIABLE TRANSMISSION (FPCVT)

(75) Inventor: Kenneth B. Hawthorn, 880 San Aleso Ave. #4, Sunnyvale, CA (US) 94085

(73) Assignee: Kenneth B. Hawthorn, Sunnyvale, CA (US)

( * ) Notice: Subject to any disclaimer, the term of this patent is extended or adjusted under 35 U.S.C. 154(b) by 926 days.

(21) Appl. No.: 11/467,565

(22) Filed: Aug. 28, 2006

(65) Prior Publication Data

US 2008/0214345 A1    Sep. 4, 2008

Related U.S. Application Data

(60) Provisional application No. 60/713,428, filed on Sep. 2, 2005, provisional application No. 60/725,020, filed on Oct. 6, 2005, provisional application No. 60/727,117, filed on Oct. 14, 2005.

(51) Int. Cl.
*F16H 9/10* (2006.01)

(52) U.S. Cl. .............................. 474/53; 474/47; 474/85

(58) Field of Classification Search ............. 474/47–57, 474/152–154, 84–85; *F16H 09/02*
See application file for complete search history.

(56) References Cited

U.S. PATENT DOCUMENTS

| | | | | |
|---|---|---|---|---|
| 3,913,410 A | * | 10/1975 | Ackerman | 474/56 |
| 4,129,044 A | * | 12/1978 | Erickson et al. | 474/55 |
| 4,167,124 A | * | 9/1979 | Zvetkov et al. | 474/53 |
| 4,740,190 A | * | 4/1988 | Pike | 474/49 |
| 2005/0148416 A1 | * | 7/2005 | Naude | 474/49 |
| 2005/0221926 A1 | * | 10/2005 | Naude | 474/8 |

* cited by examiner

*Primary Examiner*—Robert A Siconolfi
*Assistant Examiner*—Anna Momper

(57) ABSTRACT

A Continuously Variable Transmission (CVT) for use in applications where a transmission is desired to change the speed of the motor relative to the speed of the final drive. The CVT has a set of chains or belts that are mounted around a set of pins set in radially cut slots of a set of spindles so that the pattern of pins are able to expand and contract radially around the CVT axis via these slots. Sprockets that freely spin in either direction unless a chain or belt has fully seated on at least one tooth are arranged on the pins so that only one sprocket engages one chain or belt allowing for smooth ratio changes while the load in engaged. The spindles share a set of springs that act to return the transmission to a higher ratio at moments the load is overcome.

4 Claims, 10 Drawing Sheets

FIXED PITCH CONTINUOUSLY VARIABLE TRANSMISSION (FPCVT)

BACKGROUND OF THE INVENTION

1. Field of the Invention

The present invention relates to Continuously Variable Transmissions (CVT's) used in a wide variety of applications requiring ratio shifts between an engine, or motor, and the load including automobiles, recreational vehicles, turbines and industrial equipment.

2. Description of the Prior Art

In recent years CVT's have become more widely adopted in the automotive industry in a never ending effort to increase fuel efficiency and increase performance. The most widely accepted automotive CVT's today are the Push Belt CVT marked by Nissan and General Motors and NSK half toroidal CVT. Drive trains with higher horsepower ratings are not able to easily use these designs as they rely on friction to transmit power and their size, weight and sensitivity to dirt make them impractical for performance oriented motoring. Other designs have come to market for smaller horsepower applications like the NuVinci CVP. There is general agreement among experts involved in the development of new CVT's that an ideal CVT would stay positively engaged while allowing ratio shifts under full power. The Anderson CVT exhibits these qualities, but requires the use of Floating Sprocket Bars that do not reengage smoothly and require outside control to shift ratios.

SUMMARY OF THE INVENTION

It is an object of the present invention to provide a CVT capable staying positively engaged to transmit power while allowing for continuous changes in ratio. Additionally the CVT design allows for automatic ratio selection based on the difference between power and load based on the mechanical specifications used in the design of the CVT, requiring no outside control input. The CVT consists of one or more Fixed Pitch Continuously Variable Transmission (FPCVT) units each having one spindle for power input and one spindle connected to the load. These two spindles are mounted so one may rotate freely around the other and share the same axis of rotation. These two spindles each have the same number of slots cut radially. One of the two spindles has these slots so cut at a different angle or curvature than the other. One pin intersects each set of slots and has mounted on it a combination of either all idler pulleys or idler pulleys and a sprocket to transmit the power to a chain. Rotating ether spindle relative to the other will cause the pins to force a pitch diameter change of the CVT assembly and the chains mounted on each pitch line. Only one sprocket is mounted on any one pitch line on any one FPCVT, thus allowing for a ratio changes while the CVT stays engaged. The sprockets are allowed to freely spin in either direction unless a roller chain or belt has fully seated on at least one tooth profile. The spindles share a set of springs that act to return the transmission to a higher ratio at moments the load is overcome.

Other objects of the present invention will in part be obvious and will in part appear hereinafter.

The invention accordingly comprises the apparatuses and systems, together with their parts, elements, and interrelationships that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description, taken in connection with the accompanying drawings, wherein.

DETAILED DESCRIPTION OF THE PREFERRED EMBODIMENTS

Figure 1:
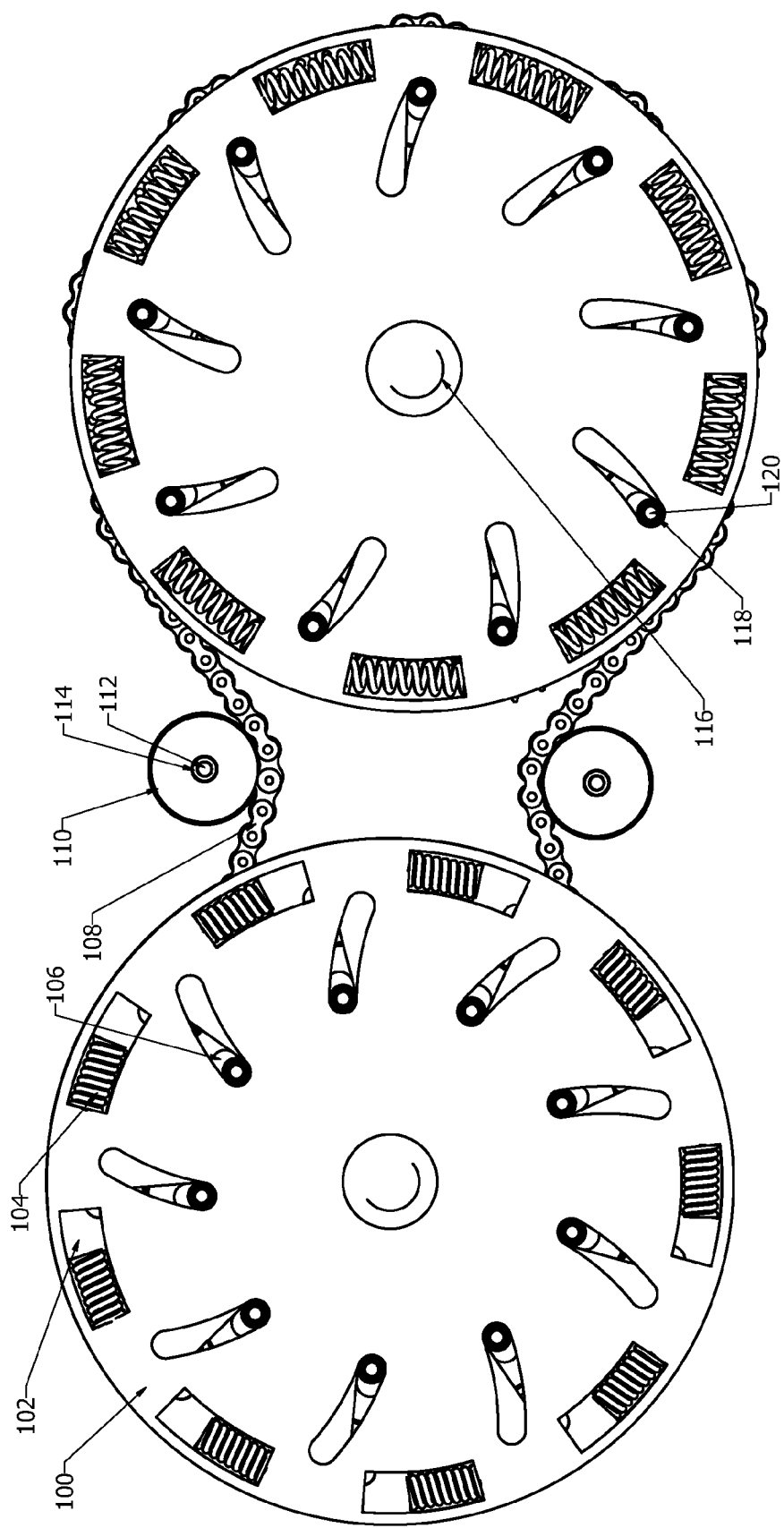
FIG. 1 is a side view of a Fixed Pitch Continuously Variable Transmission (FPCVT) assembly with two FPCVT units connected in series. This drawing, as well as drawings in the following Figures can be more easily understood when viewed in a landscape orientation with the Fig # defining the lower left hand corner of the drawing. References to "left hand" or "right hand" in Figures set forth in this specification are best understood with the Figures oriented in this landscape orientation.
Figure 2:
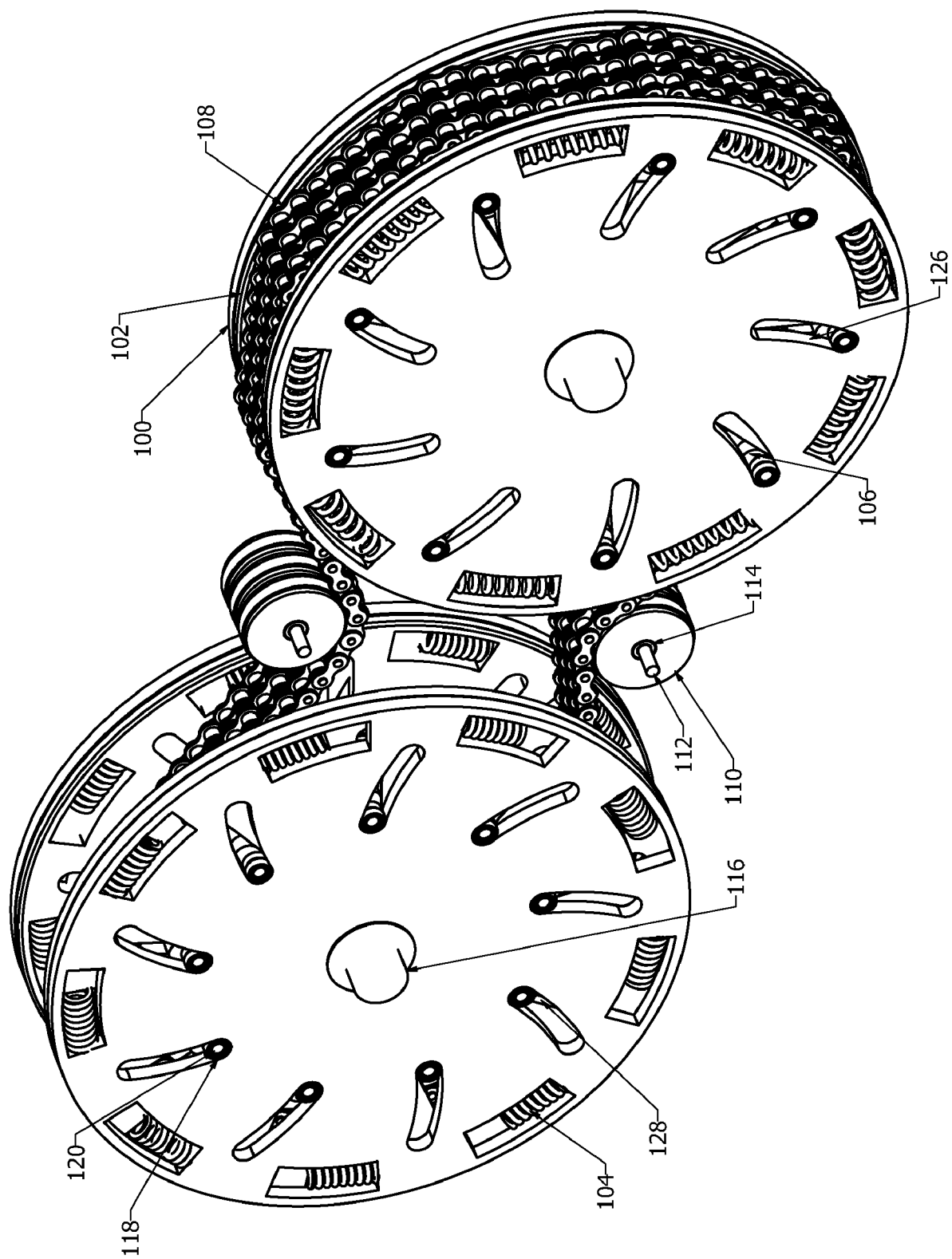
FIG. 2 is a perspective view of a Fixed Pitch Continuously Variable Transmission assembly with two FPCVT units connected in series.
Figure 3:
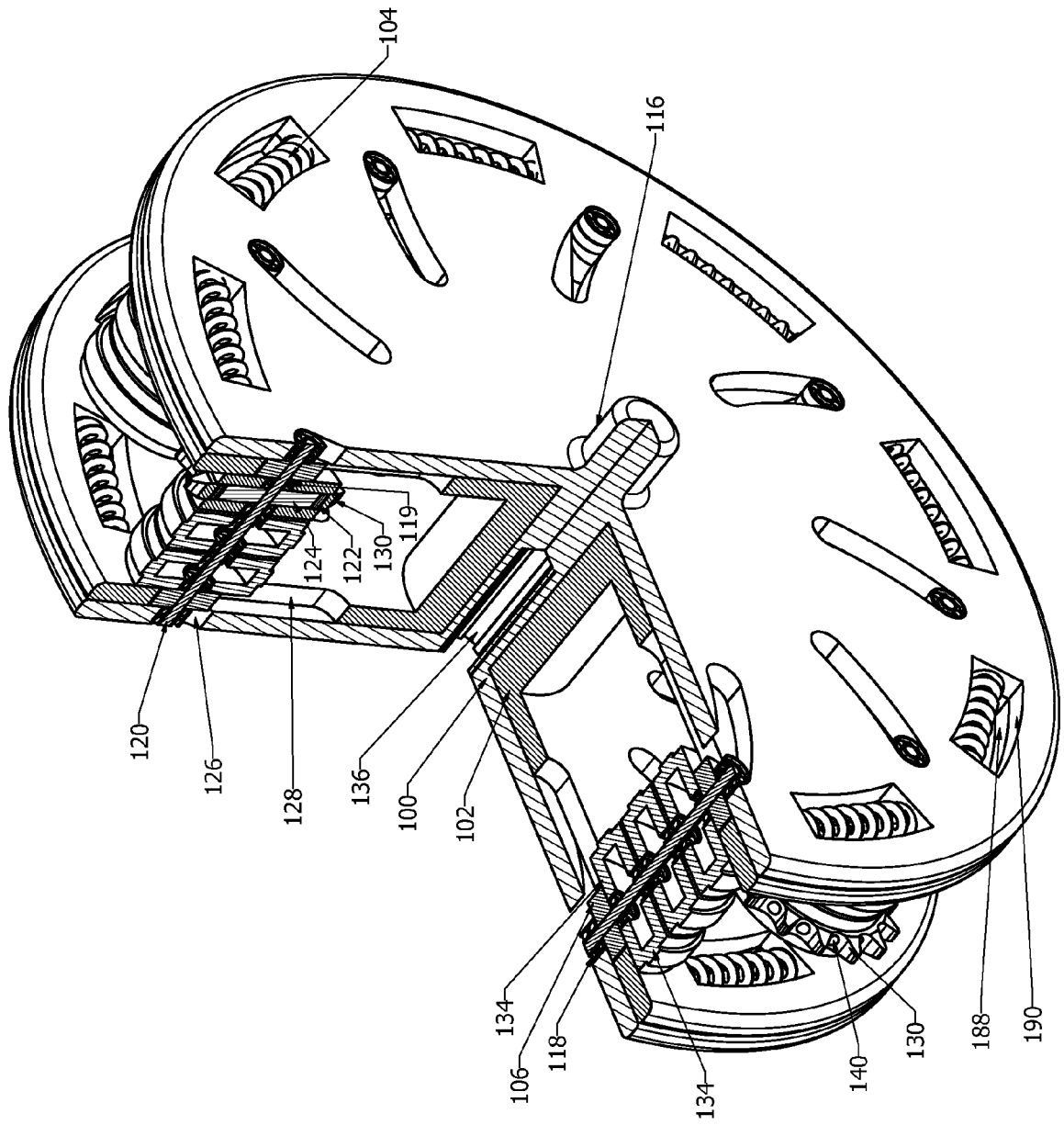
FIG. 3 is a section view of a single FPCVT unit showing the cross sections of two pin assemblies, one with a sprocket and two idler pulleys and one with only idler pulleys.
Figure 4:
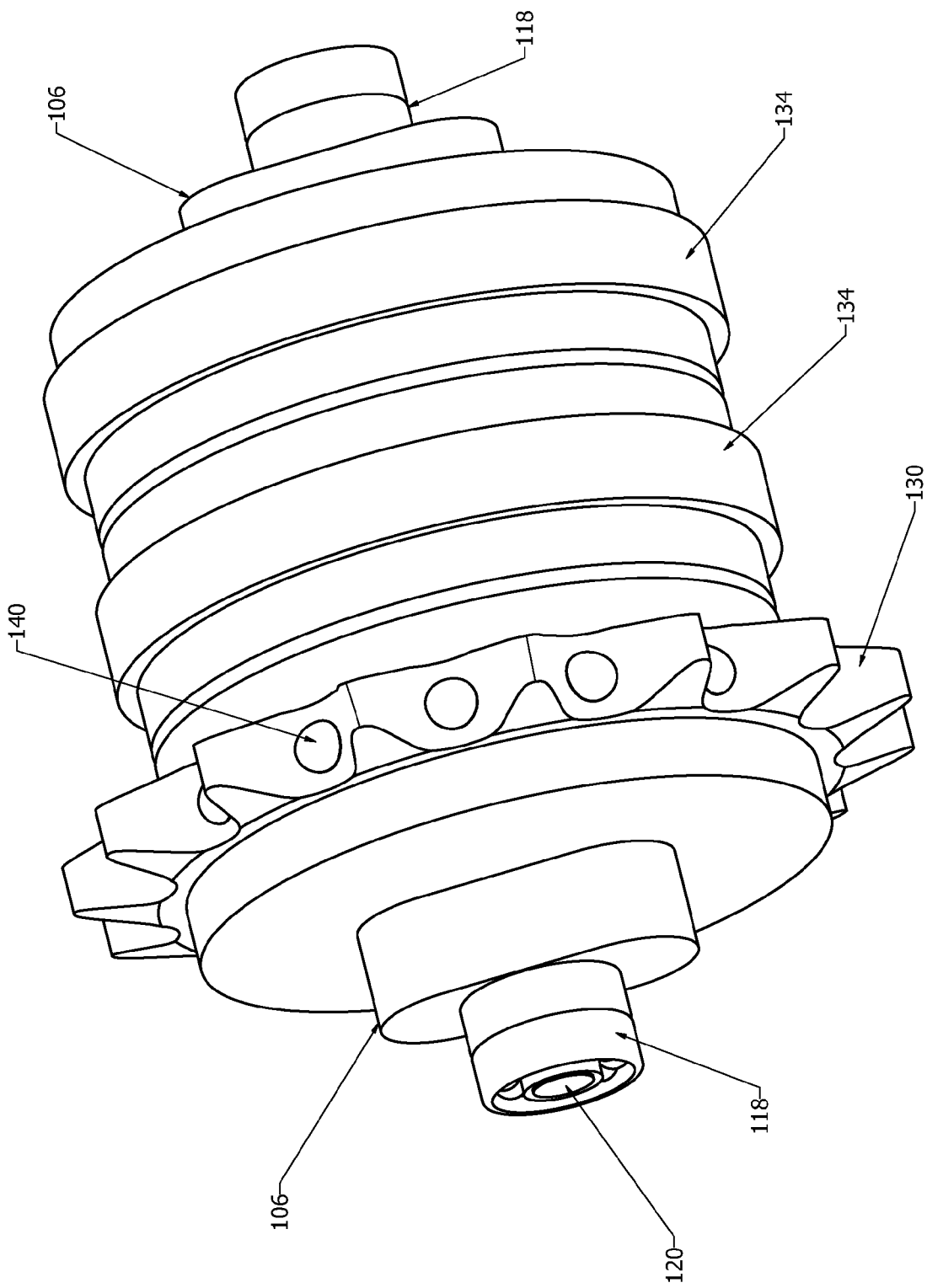
FIG. 4 is a perspective view of a pin assembly with a sprocket.
Figure 5:
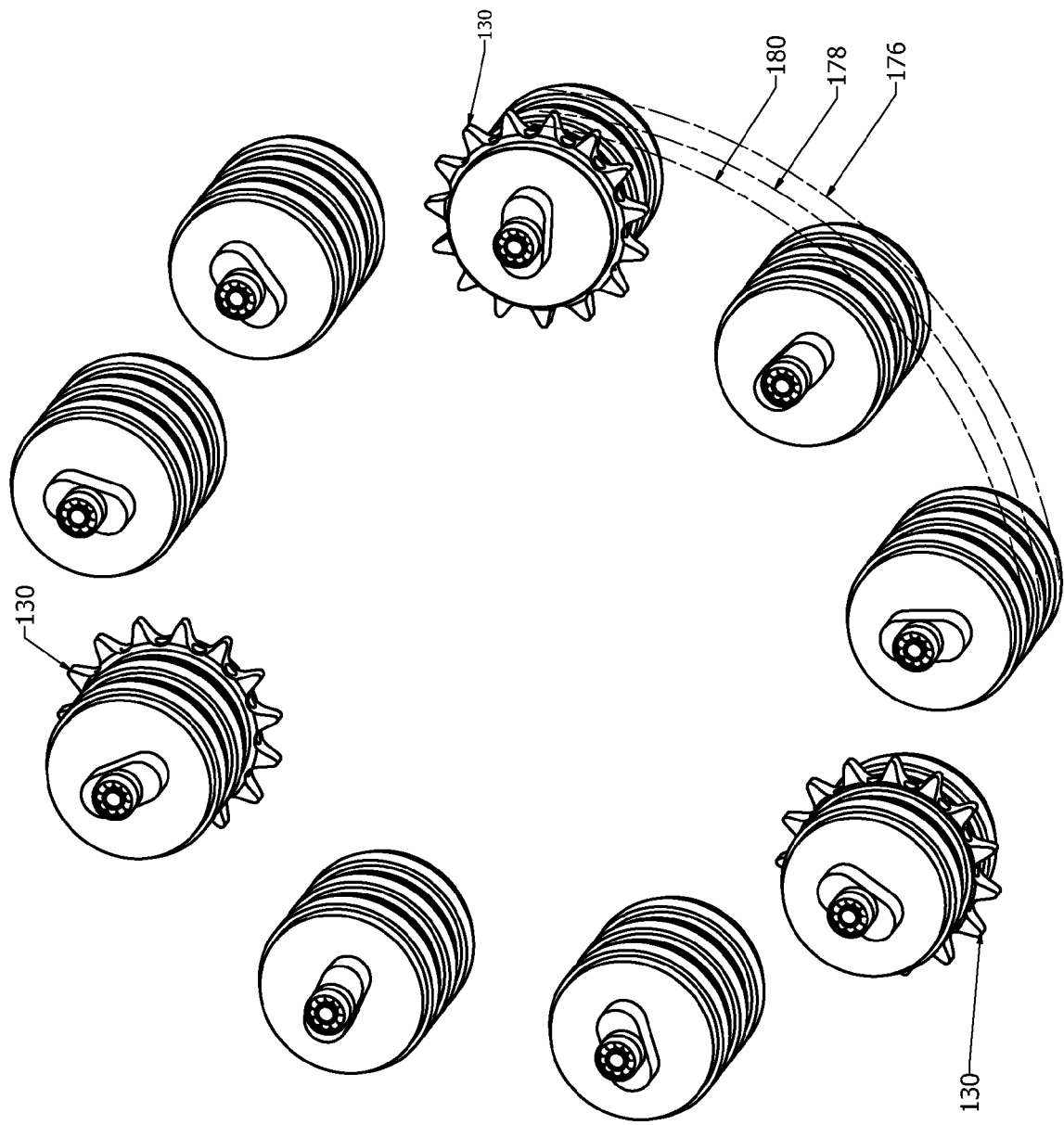
FIG. 5 is a perspective view of all of the pin assemblies in the preferred embodiments showing each of the sprockets arranged to engage only one pitch line each.

Referring now to drawings, in FIG. 1 the CVT is constructed with two identical Fixed Pitch Continuously Variable Transmission (FPCVT) assemblies. Referring now to FIG. 2 the two assemblies are connected by three roller chains 108. Referring to FIG. 3 the two assemblies shown in FIG. 2 are each comprised of: spindle 102 mounted inside spindle 100 sharing the same main axis of rotation and free to rotate around that main axis. Of the identical FPCVT assemblies shown in FIG. 1 and FIG. 2 keyway 136, shown in FIG. 3., on the right hand side FPCVT unit is connected to an engine or motor output shaft. Keyway 136 on the left hand side FPCVT unit is connected to the load. Spindle 100 is mounted via bearings to hard points of the transmission case via bearing mount 116. Nine slots 126 are cut radially though both faces of spindle 100. Nine slots 128 are cut radially though both faces of spindle 102, but at an angle and curvature relative to slots 126. One pin 120 intersects each pair of slots 126, via bearings 118, and slots 128 via liner bearings 106. Bearings 118 allow pins 120 to slide freely along slots 126. Linear bearings 106 allow pins 120 to slide along slots 128, but are attached to pins 120 in such a way as to not allow any rotation of pin 120 around its own axis. Referring now to FIG. 4, mounted on each Pin 120, equally spaced between linear bearings 106, are either two freely rotating idler pulleys 134 and one sprocket 130 containing a sprocket assembly (see FIG. 8 and FIG. 9) or three idler pulleys 134. The three pitch lines 176, 178 and 180 shown in FIG. 5 are spaced equally along pin 120 and each intersect only one sprocket 130. Each idler pulley 134 mates to pin 120 so that idler pulley 134 can rotate around pin 120 freely. Of the nine pins 120 only three pins have sprockets 130. Referring to FIG. 5 placement of pins 120 with sprockets 130 is one for every three pins in sequence, as counted along the circumference formed by all nine pins 120. Each of these three pins 120 have a different, but sequential position for sprocket 130 so that each FPCVT assembly has only one sprocket 130 engaging each pitch line.

Figure 6:
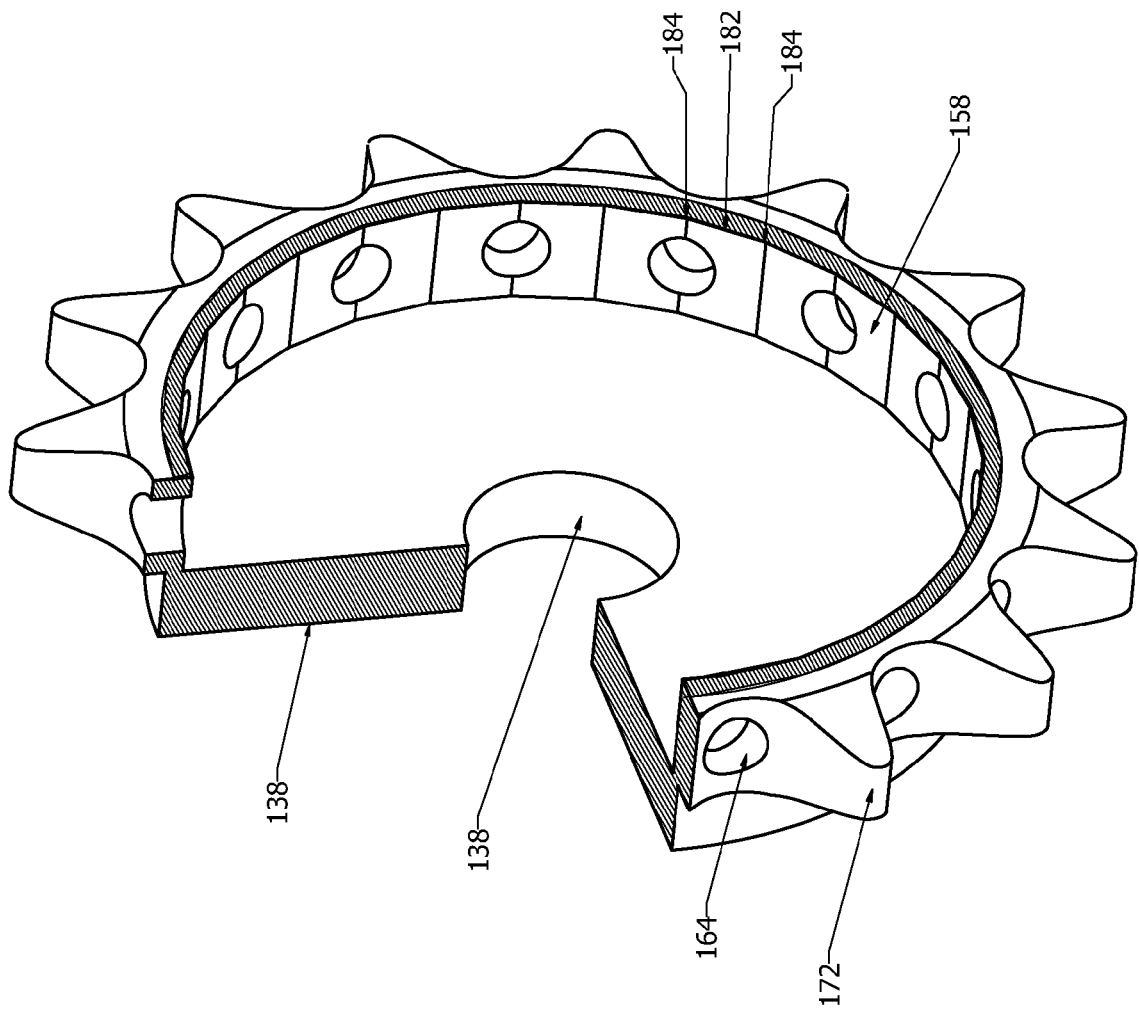
FIG. 6 is a two way section view of a sprocket.
Figure 7:
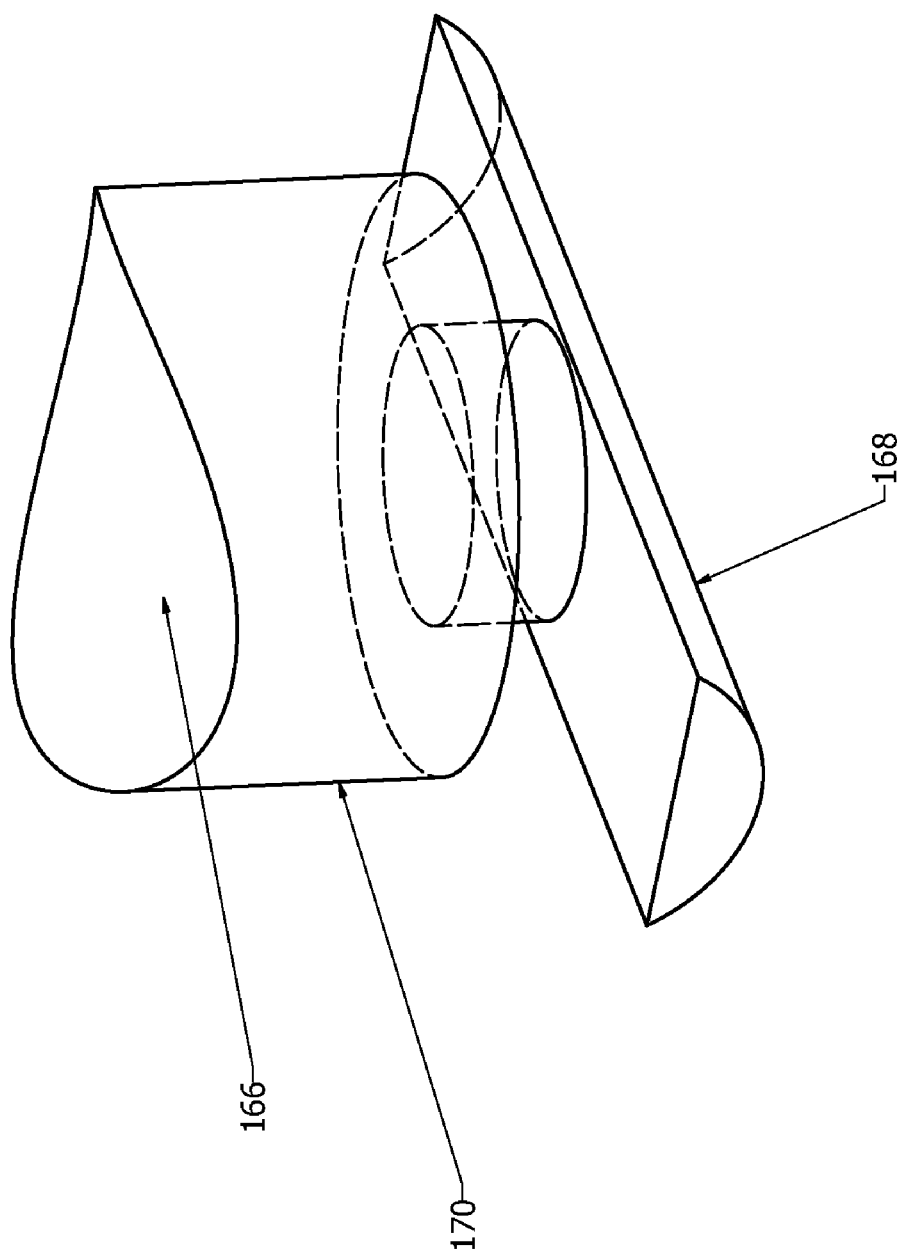
FIG. 7 is a perspective view of a feeler pin.
Figure 8:
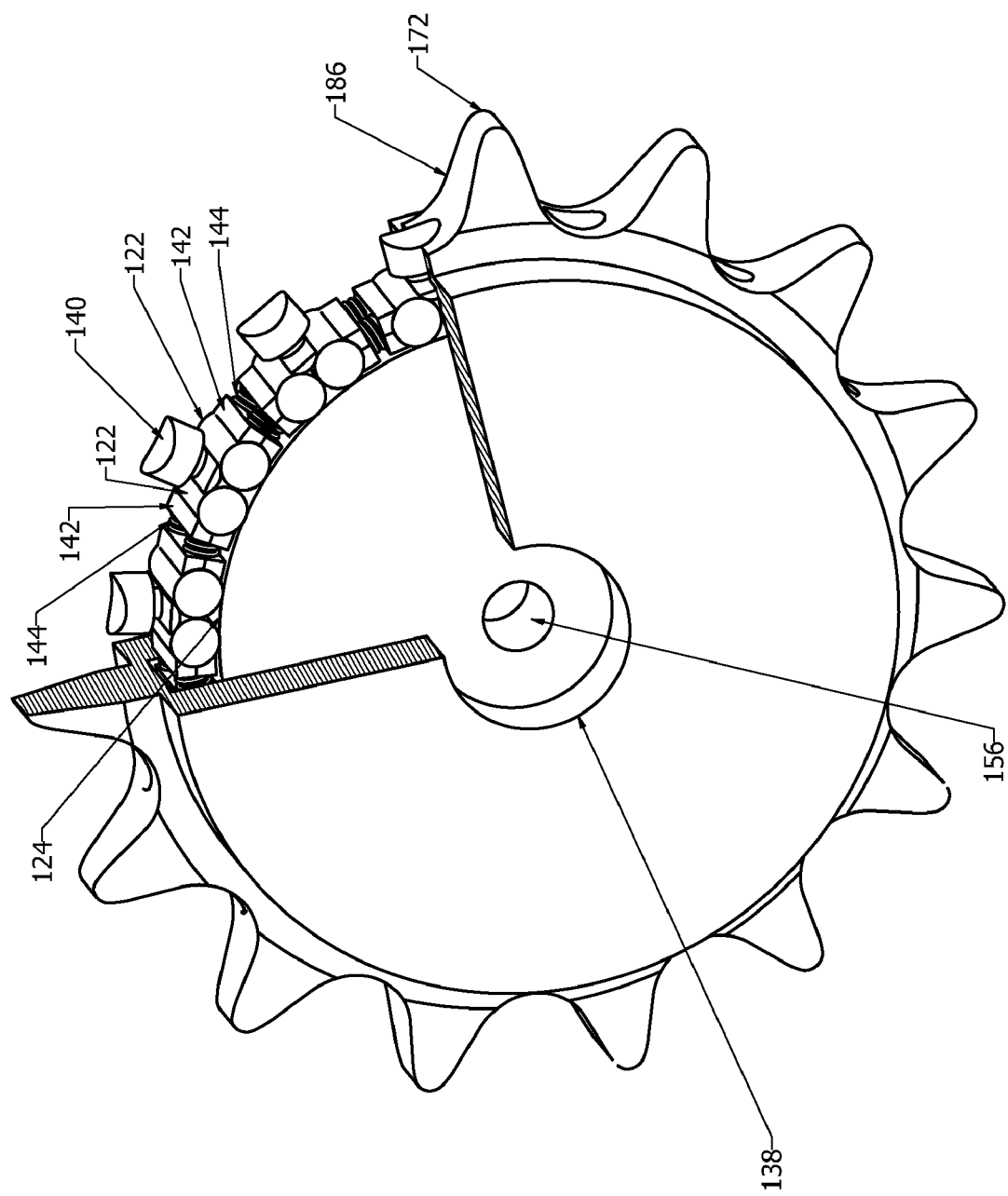
FIG. 8 is a partial section view of a sprocket assembly showing the placement of the spring blocks, springs, feeler pins and inner race.
Figure 9:
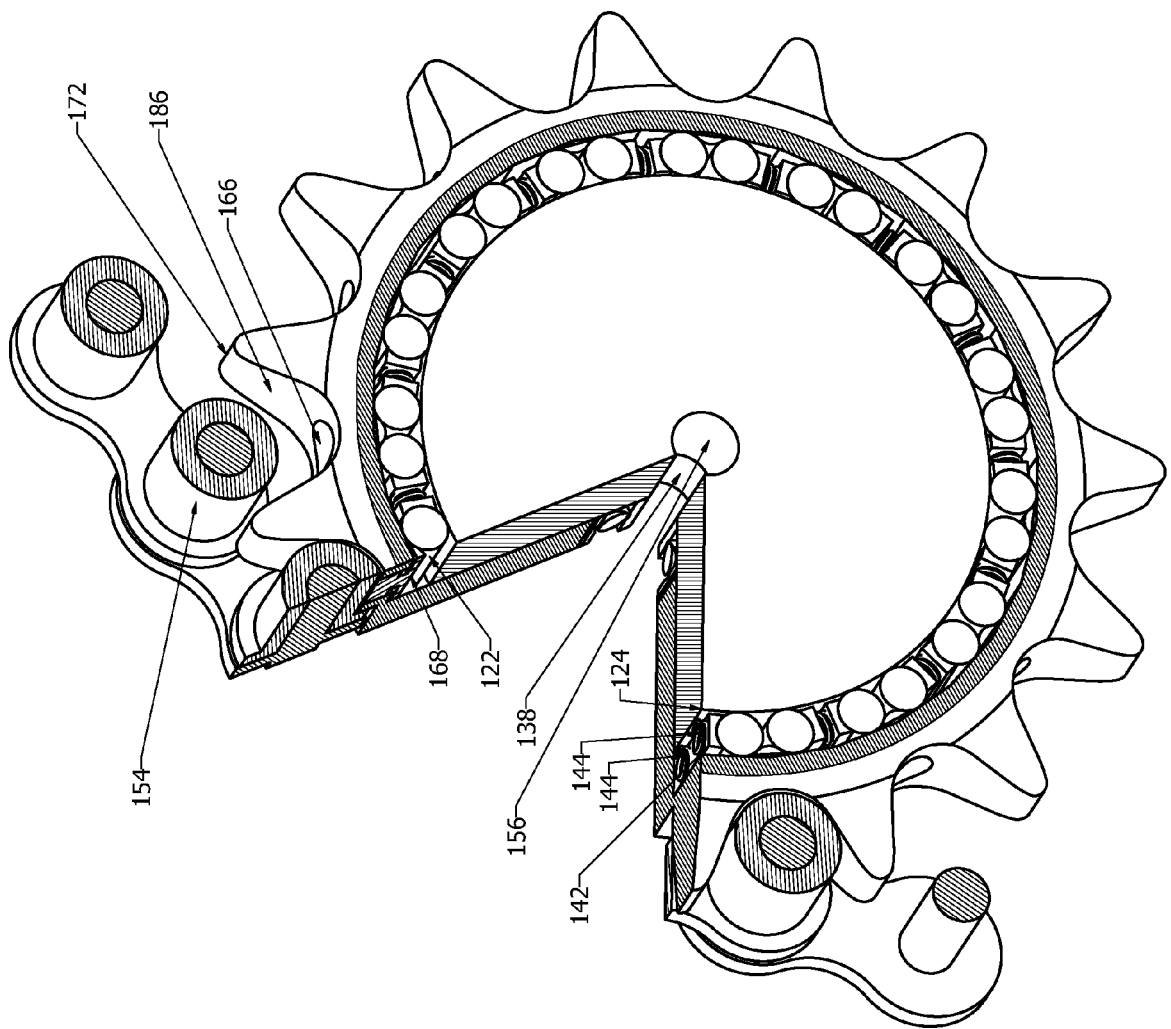
FIG. 9 is a two way section view of a sprocket assembly with a roller chain section.
Figure 10:
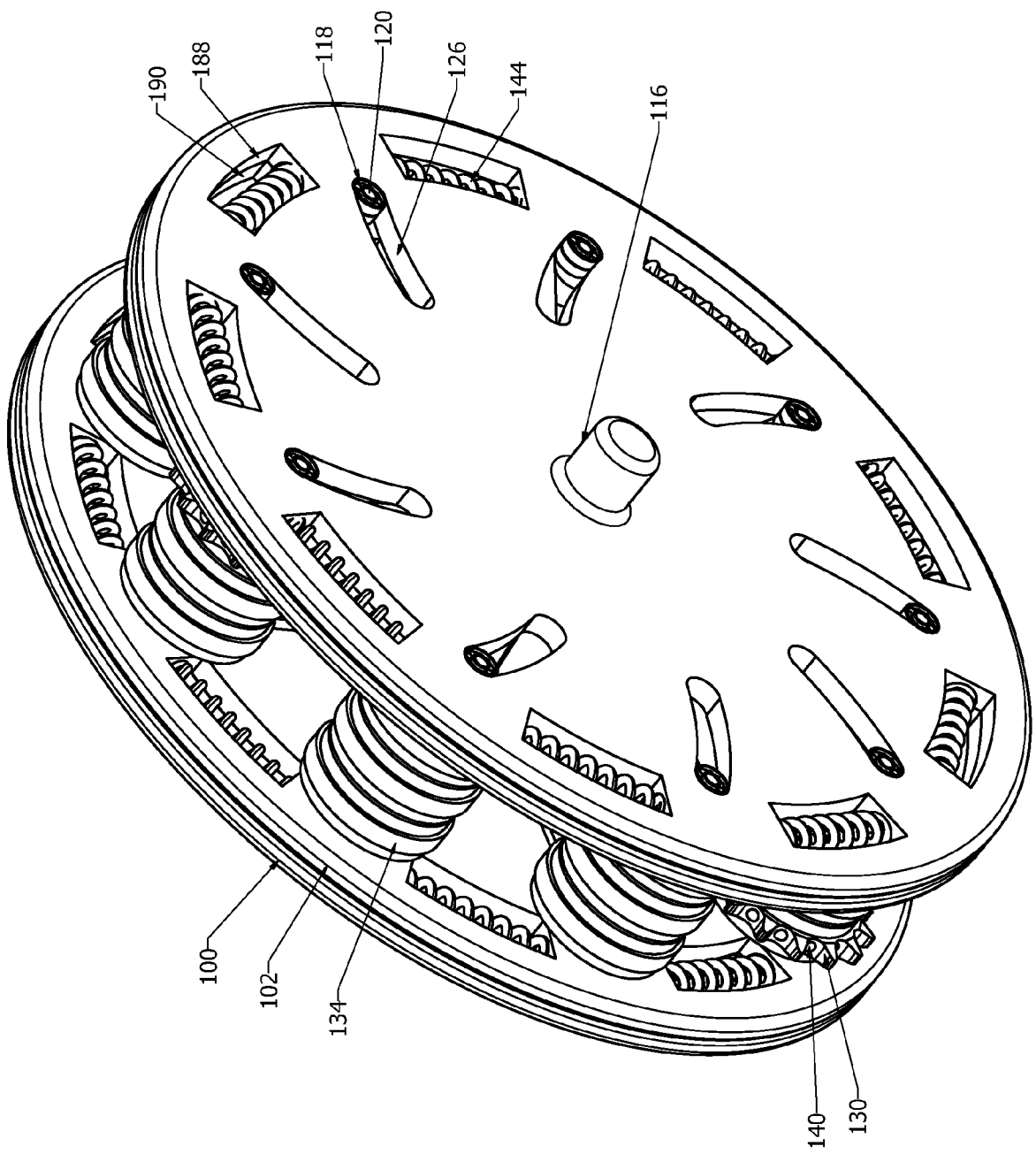
FIG. 10 is a perspective view of a single FPCVT unit.

Referring to FIG. 3, FIG. 8 and FIG. 9 bearing race 124 is fixed to pin 120 in FIG. 3 by hole 156 so that it may not rotate around pin 120. Sprocket 130 is supported via bearings 119 mounted in hole 138 allowing sprocket 130 to freely rotate around bearing race 124 when not fully engaged by a chain. As sprocket 130 is engaged by roller chain 108 rollers 154 slide along the sprocket tooth tip 172 and sprocket tooth face 186 positioning sprocket 130 to allow rollers 154 to become fully seated. As rollers 154 become fully seated feeler pin 140 is pushed down by face 166 (FIG. 7) so body 170 slides through hole 164 (FIG. 6) and surface 168 (FIG. 7) overcomes the resistance of springs 144 transmitted through spring blocks 142 and rollers 122 so that rollers 122 contact both bearing race 124 and ramps 158 (FIG. 6) locking sprocket 130 and preventing rotation in either direction. This locking action is the same principal as commonly existing wedge ramp or roller ramp type one way clutches and effectively makes the sprocket 130 a point of engagement on roller chain 108 when rollers 154 are fully seated in one or more teeth 186. As the FPCVT unit (FIG. 3) rotates around its axis sprockets 130 lock in both directions when rollers 154 are fully seated as described above and in the same fashion become free to rotate when rollers 154 are not fully seated in sprocket 130. This cycle happens once per revolution of the FPCVT unit around its axis. Referring now to FIG. 1 and FIG. 2. idler pulleys 110 operate to increase the wrap of chain 108 around each FPCVT assembly. Pins 112 are fixed to hard points and allow the free rotation of idler pulleys 110 via bearings 114.

Continuing to refer to FIG. 3, nine slots 188 and 190 are radially cut in each face of spindles 102 and 100 respectively. One spring 104 is mounted between slot 188 on spindle 100 and slot 190 on spindle 102 so that springs 104 progressively resist any rotation of spindle 102 relative to spindle 100 as power is applied from an engine or motor output shaft to spindle 100 via keyway 136 and a load is applied to spindle 102 via chains 108.

The fully assembled CVT consisting of two identical FPCVT units as shown in FIG. 1 operates to mechanically solve an equation that calls for certain ratio at a given power input and load. The solution to the equation is mechanically programmed by specifying the rate of springs 104 to be used and the curvature and angle of slots 126 relative to slots 128. Power from an engine or motor is applied to keyway 136 on the FPCVT unit shown to the right hand side of FIG. 1. The load is applied to keyway 136 on the FPCVT unit shown to the left hand side of FIG. 1 While the FPCVT is at rest springs 104 in the FPCVT unit on the right are fully expanded, pins 120 in on that same FPCVT unit form the largest possible pitch diameter and pins 120 on the left hand side FPCVT form the smallest possible pitch diameter as springs 104 in the left hand side FPCVT unit are compressed. As power is applied clockwise to spindle 100 of the right hand side FPCVT unit it will share the actual rotational distance with spindle 102 on the same FPCVT unit as springs 104 absorb the twisting input. At the same time spindle 102 on the left hand FPCVT unit is forced to rotate clockwise because it is connected by whatever number of roller chains 108 are fully seated in sprockets 130 in both FPCVT units simultaneously. The net effect of this power input is that pins 120 in the right hand FPCVT unit will contract in pitch diameter while at the same time pins 120 in left hand FPCVT unit will expand in pitch diameter. This motion will continue until the ratio is sufficiently low enough to overcome the load. The engine input will then rotate the load connected to the spindle 102 on the left hand side FPCVT unit. Conversely, as the load decreases for a given power input, the pins in on the right hand side FPCVT unit will expand in pitch diameter while at the same time the pins 120 in the left hand side FPCVT unit will contract in pitch diameter offering progressively higher ratios. These ratio adjustments happen anytime there is a change in engine input or load, both when the load is in motion, and when it is static. The angle and curvature of slots 126 are such that pins 120 in the right hand side FPCVT unit will contract or expand in an opposite and equal action to the pins 120 in the left hand side FPCVT unit.

The form of the invention shown and described herein constitutes the preferred embodiment of the invention; it is not intended to illustrate all of the possible forms thereof. The words used are words of description rather than of limitation, and various changes may be made from that which is described here without departing from the spirit and scope of the invention.

I claim:

1. A continuously variable transmission driven by an engine or motor and capable of continually transmitting power while allowing shifting of a ratio of said continuously variable transmission, comprising:

a plurality of chains or belts, wherein each of said plurality of chains or belts defines a separate and parallel pitch line;

a first mechanism rotatable about a first axis and comprising a plurality of first sprockets arranged radially about said first axis and engaging said plurality of chains or belts;

wherein each of said plurality of first sprockets engage only one pitch line and a corresponding chain or belt; and wherein each of said plurality of chains or belts engages only one of said plurality of first sprockets; and wherein each of said plurality of first sprockets actuating closer or further away from said first axis;

a second mechanism allowing each of said plurality of first sprockets to rotate freely when said corresponding chain or belt is not fully seated in at least one tooth of said first sprocket and lock against rotation around a first sprocket axis when corresponding chain or belt is seated in at least one tooth of said first sprocket.

2. The continuously variable transmission of claim 1, further comprising:

a third mechanism rotatable about a second axis and comprising a plurality of second sprockets arranged radially about said second axis and engaging said plurality of chains or belts;

wherein each of said plurality of second sprockets engage only one pitch line and a corresponding chain or belt; and wherein each of said plurality of chains or belts engages only one of said plurality of second sprockets; and wherein each of said plurality of second sprockets actuating closer or further away from said second axis;

a fourth mechanism allowing each of said plurality of second sprockets to rotate freely when said corresponding chain or belt is not fully seated in at least one tooth of said second sprocket and lock against rotation around a second sprocket axis when corresponding chain or belt is seated in at least one tooth of said second sprocket;

wherein said first axis and said second axis being aligned in parallel such said first mechanism is driven by said third mechanism via said plurality of chains or belts.

3. A continuously variable transmission driven by an engine or motor, comprising:

a first spindle, rotatable about a first main axis and connected to an engine or motor output shaft driving a load via a plurality of chains or belts each defining a separate and parallel pitch line;

wherein said first spindle having a number of circumferentially spaced and radially extending first slots;

wherein a plurality of first pins engage said first slots, said plurality of first pins actuatable closer or further away from said first main axis;

wherein a plurality of first sprockets are supported on a number of the plurality of first pins, and wherein the number of first sprockets is less than the number of first pins; and wherein the number of first sprockets is equal to the number of chains or belts; and wherein each of said plurality of first sprockets engages a single chain or belt of said plurality of chains or belts;

wherein each of said plurality of first sprockets rotates freely around a first sprocket rotational axis when the corresponding chain is not fully seated on said first sprocket, and locks against rotation around said first sprocket rotational axis when the corresponding chain is fully seated on said first sprocket.

4. The continuously variable transmission of claim 3, further comprising:

a second spindle rotatable about a second main axis and connected to an engine or motor output shaft and driving said first spindle via said plurality of chains or belts;

wherein said second spindle having a number of circumferentially spaced and radially extending second slots;

wherein a plurality of second pins engage said second slots, said plurality of second pins actuatable closer or further away from said second main axis;

wherein a plurality of second sprockets are supported on a number of the plurality of second pins, and wherein the number of second sprockets is less than the number of second pins; and wherein the number of second sprockets is equal to the number of chains or belts; and wherein each of said plurality of second sprockets engages a single chain or belt of said plurality of chains or belts;

wherein each of said plurality of second sprockets rotates freely around a second sprocket rotational axis when the corresponding chain is not fully seated on said second sprocket, and locks against rotation around said second sprocket rotational axis when the corresponding chain is fully seated on said second sprocket;

wherein said first and second spindles have parallel axis of rotation; and wherein said first and second slots have different angle or curvature than the other.

* * * * *